(12) United States Patent
Saiki

(10) Patent No.: US 8,785,028 B1
(45) Date of Patent: Jul. 22, 2014

(54) HIGH CONDUCTIVITY BATTERY CONTACT

(75) Inventor: Neal Tate Saiki, Santa Cruz, CA (US)

(73) Assignee: NTS Works, Inc., Santa Cruz, CA (US)

( * ) Notice: Subject to any disclaimer, the term of this patent is extended or adjusted under 35 U.S.C. 154(b) by 225 days.

(21) Appl. No.: 13/368,343

(22) Filed: Feb. 8, 2012

(51) Int. Cl.
*H01M 2/26* (2006.01)
*H01M 2/22* (2006.01)

(52) U.S. Cl.
CPC ........................... *H01M 2/22* (2013.01)
USPC ............................................. 429/121

(58) Field of Classification Search
CPC ............................................. H01M 2/30
USPC ............................................. 429/121
See application file for complete search history.

(56) References Cited

U.S. PATENT DOCUMENTS

| | | | |
|---|---|---|---|
| 5,091,771 A * | 2/1992 | Bolan et al. | 361/751 |
| 5,169,733 A | 12/1992 | Savovic | |
| 6,303,248 B1 | 10/2001 | Peterson | |
| 7,807,290 B2 | 10/2010 | Saiki | |
| 2004/0142233 A1 | 7/2004 | Park | |
| 2004/0253867 A1* | 12/2004 | Matsumoto | 439/500 |
| 2010/0068619 A1* | 3/2010 | Kaplin | 429/174 |
| 2011/0223776 A1 | 9/2011 | Ferber | |

* cited by examiner

*Primary Examiner* — Gary Harris
(74) *Attorney, Agent, or Firm* — Landmark Intellectual Property Law, PC

(57) ABSTRACT

A high conductivity battery contact that comprises: a printed circuit board, a compressive spring, a tab containing thin, flat and highly electrically conductive metal. Said tab has three sections: a mounting section connected to said printed circuit board, a flexible intermediate section and a contact section with an outward facing surface roughly parallel with said circuit board. These parts form a layered assembly with said compressive spring positioned between the tab contact section and the printed circuit board. When a cylindrical battery cell is placed into position, the tab contact section is pressed into contact against an end of said cylindrical battery cell by said compressive spring.

20 Claims, 6 Drawing Sheets

HIGH CONDUCTIVITY BATTERY CONTACT

BACKGROUND

1. Field of Invention

This invention relates to the construction of a robust, high conductivity, inexpensive, easy to assemble and serviceable battery contacts for cylindrical battery cells. These battery contacts can be used repeatedly on a printed circuit board to form a larger battery module. Battery modules can be combined to form a larger battery pack. The high conductivity battery contacts allow the utilization of high energy density battery cells such as lithium ion cylindrical cells for high power applications. These battery packs have numerous applications such as electric tools, energy storage and electric vehicles.

2. Discussion of Prior Art

Recent advances in batteries based on lithium chemistries have led to the development of small batteries with extremely high energy density. Unfortunately the inherent thermal stability problems associated with lithium based chemistries severely limits the size of these batteries. The safest and most common lithium based batteries are the lithium ion cells which are available in a small cylindrical form.

There are many devices, for example electric vehicles, that require large stores of energy for electrical power. To address these needs, conventional approaches create a battery pack out of many individual smaller cells and electrically connect them in both series and parallel. This configuration typically produces a desired combination of output voltage and current. In many configurations using this approach, hundreds or thousands of cells may need to be connected together in order to achieve the desired combination of capacity, output voltage and current. This task of assembling large quantities of cells together in a robust and economical way is a new challenge that is not adequately solved by conventional assembly methods.

Manufacturing battery cell assemblies requires significant care and precision in order to create a viable product. For example, with respect to these traditional assemblies, cells are electrically connected to each other by permanent cell tabs. These cell tabs are typically made from thin strips of nickel or stainless steel. The cell tabs are connected to each cell by either spot welding or soldering. The cell tabs must be thin enough to weld to the cell without damaging the cell from excessive welding or soldering heat. In addition, most battery cells, particularly those based on lithium chemistry, are very intolerant of heating. Overheating these types of cells damages the cell chemistry. The result is reduced cell capacity to store energy or premature cell failure.

As for applications of the battery cell assemblies, many devices such as electric vehicles require large amounts of peak current. Thus, each cell tab must be large enough to carry this heavy current load. The nickel alloy typically used is only one fifth the conductivity of copper so the size of the tab must be many times larger in order to have equivalent resistance. Unfortunately, these large interconnects are difficult to weld or solder to the cells without damaging them. Moreover, a reliability problem arises when using large interconnects because they are stiff. The stiff interconnects do not allow for minute cell movement that might occur during thermal expansion or vibration.

Serviceability of the battery pack is also an issue. A pack assembled with all welded construction cannot easily be disassembled in order to replace a cell. It is also difficult to assemble large clusters of cells that have been welded together due to their weight, bulk and fragile connections.

Placement of auxiliary components such as fuses, temperature sensors and temperature cutoffs are also a problem. When these components are wired to lengths of insulted wire, they become cumbersome and difficult to install or remove for service. A typical battery pack is covered with complex runs of electrical wires. Routing and maintaining all of the wires makes assembly difficult and expensive.

When only low conductivity battery contacts are required, there are numerous designs that utilize steel or steel alloy springs for the contacts. This is the common battery contact found in most battery devices such as flashlights. The functionality and serviceability of these contacts is excellent, but there are no designs that can handle high current.

Thus, there is lacking, inter alia, a battery cell assembly that allows for high current carrying capacity, robust construction with flexibility, cost effective manufacturing, ease of assembly, structural integrity, serviceability and a reduction in the number of failure points within the assembly.

OBJECTS AND ADVANTAGES

Accordingly, several objects and advantages of my invention are:
a) utilizes high conductivity metals such as copper or silver for low electrical resistance
b) highly vibration resistant and reliable
c) the battery cells are not exposed to heat from soldering or welding
d) the battery cells are easily accessed for service and individual replacement
e) the use of a PCB board for a cell to cell interconnect is inexpensive and allows complex high current electrical routing
f) the use of a PCB facilitates the wiring and mounting of other electrical components such as fuses, thermal sensors, thermal disconnects and voltage sensors
g) the use of a PCB provides strong and rigid structural support of the assembly
h) uses cost effective and commonly available manufacturing techniques
i) easy to assemble Still further objects and advantages of my invention will become apparent from a consideration of the drawings and ensuing description.

DRAWING FIGURES

The disclosed embodiments have other advantages and features which will be more readily apparent from the detailed description, the appended claims, and the accompanying figures (or drawings). A brief introduction of the figures is below.

Figure 1:
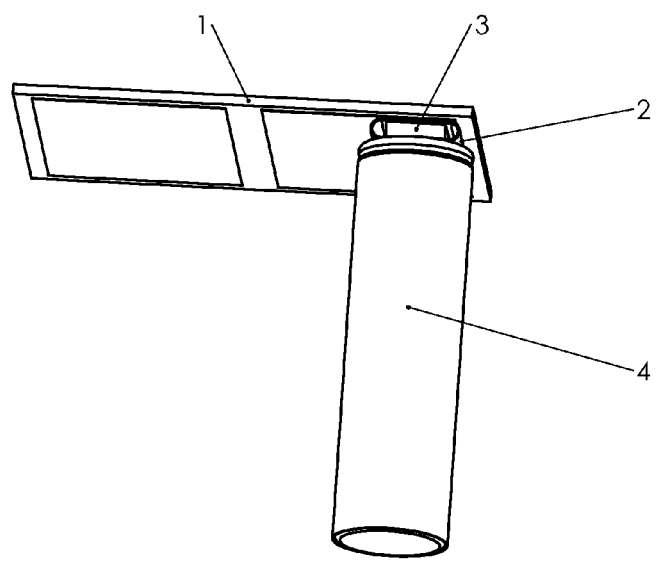
FIG. 1 illustrates one embodiment of the high conductivity battery contact.

LIST OF REFERENCE NUMERALS IN DRAWINGS 1. printed circuit board
2. tab
3. elastomeric pad
4. cylindrical battery cell
5. tab mounting section
6. tab flexible intermediate section
7. tab contact section
8. tab with single ear
9. tab with stepped shape

DESCRIPTION

First Embodiment

Figure 1A:
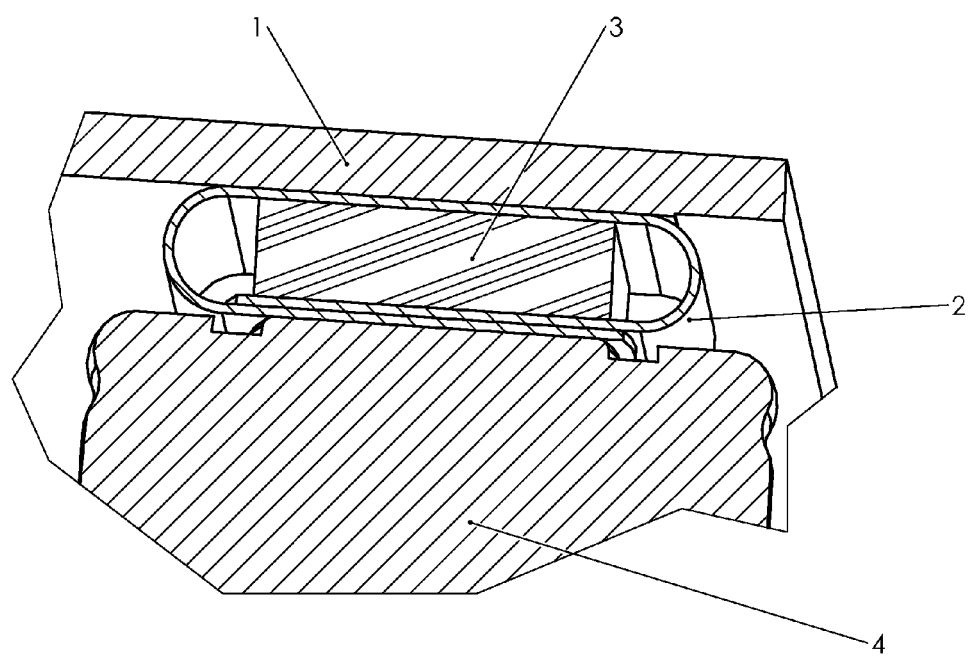
FIG. 1A illustrates a close up section view of one embodiment of the high conductivity battery contact.

One embodiment of the current invention is illustrated in perspective in FIG. 1 and in sectioned close-up in FIG. 1A. These drawings are not to scale due to the thin nature of some of the parts.

A printed circuit board 1 is a generally planar surface containing dielectric materials for a substrate and conductive electrical pathways, tracks or signal traces containing conductive metal. It is possible to have numerous combinations of dielectric materials and electrical pathways. This embodiment uses a printed circuit board (PCB) similar to ones commonly used in electronics. PCB's are easy to manufacture and low cost. Manufacturing of the conductive pathways is typically accomplished by etching or depositing of metal, but other methods are possible. The conductive traces can be on the exterior faces or contained within interior layers. This ability to have multiple layers of conductive pathways that are electrically isolated allows complex electrical routing. Conductive pathways can cross each other on different layers and remain isolated. The use of a PCB also allows the integration of additional circuits such as temperature monitoring, fuses, circuit breakers, voltage monitoring, current monitoring, etc.

Some possible dielectric materials used in a PCB are polytetrafluoroethylene (Teflon), FR-4, FR-1, CEM-1 or CEM-3. Many printed circuit boards are laminated together with epoxy resin prepreg. Well known prepreg materials used in the PCB industry are FR-2 (Phenolic cotton paper), FR-3 (Cotton paper and epoxy), FR-4 (Woven glass and epoxy), FR-5 (Woven glass and epoxy), FR-6 (Matte glass and polyester), G-10 (Woven glass and epoxy), CEM-1 (Cotton paper and epoxy), CEM-2 (Cotton paper and epoxy), CEM-3 (Woven glass and epoxy), CEM-4 (Woven glass and epoxy), CEM-5 (Woven glass and polyester). FR-4 is a very common PCB material and provides significant structural strength.

The thickness of the PCB is typically on the order of 0.062 to 0.125 inches. Thicker boards can provide more structural resistance to deformation. The PCB not only holds the conductive pathways, but also provides structural support for the whole battery assembly. A PCB made from FR-4 in the thickness of 0.125 inches is very rigid, lightweight and strong enough to support larger cell assemblies. The PCB functions as a very strong inner wall in a larger pack assembly that may have double or triple exterior walls.

The electrical pathways of a PCB are generally made from copper, but other conductive materials such as tin, silver, gold or aluminum could be used alone, in combination alloys or as plating materials. The electrical pathways in this embodiment are bonded on the face of the PCB.

A tab 2 is electrically connected to the electrical pathways. In this embodiment the tab is a formed strip of thin copper. Copper or other high conductivity metals are preferable to handle high currents. Plating of the copper is preferred to prevent corrosion. Materials such as tin, gold or silver are used alone or in combination for plating materials. In this embodiment, the tab in profile view is in the shape of a racetrack; a hollow shape with two flat sides with rounded semi-circular ends connecting each flat side. One flat side is formed by the overlapping ends of the strip. The other flat side is approximately midway between the ends. There is a bend radius at each semi-circular bend to form a parallel gap in middle of the section. When the assembly is not compressed, the gap is on the order of 0.10 to 0.30 inches. The exact gap dimension is not critical so smaller of larger gaps may also function.

An elastomeric pad 3 is located inside of the tab hollow space. The pad comprises elastomeric material so as to have the quality of being compressible and preferably with minimal compression set. Additional material qualities such as high temperature resistance and resistance to aging are also desirable. Materials such as those comprising silicone in either solid or foam structure are suitable. Silicone foam comes in either open or closed cell structure. The pad should have a thickness to fill the inside of the tab cavity. The length and width of the elastomeric pad should be approximately within the area of the flat end of the tab. A circular, square or combined shape would be acceptable as long as it is a substantial portion of the area under the flat end section of the tab.

The elastomeric pad may or may not be mechanically held in position. During assembly or disassembly, the pad may shift out of position, so some additional means of securing may be desired. Some examples of securing means may include adhesive or possibly small features on the tab such as tiny tabs oriented perpendicular to the major plane of the tab. Additionally, small features in the pad could be molded into the pad to secure around features or edges of the tab.

A cylindrical battery cell 4 is shown to illustrate the positioning of the cell relative to the rest of the assembly. Cylindrical battery cells are the most common form factor for battery cells. They are cylindrical or approximately cylindrical in shape. One end is electrically charged with one polarity and the other end and possibly the side is charged in the opposite polarity. The actual end surface can vary. Some ends terminate in a smaller raised circular area sometimes referred to as a button. The button diameter is on the order of half the diameter of the body, but this dimension can vary. The cell is oriented so that one of the charged end surfaces is pressed in contact with the outer flat section of said tab.

Figure 2:
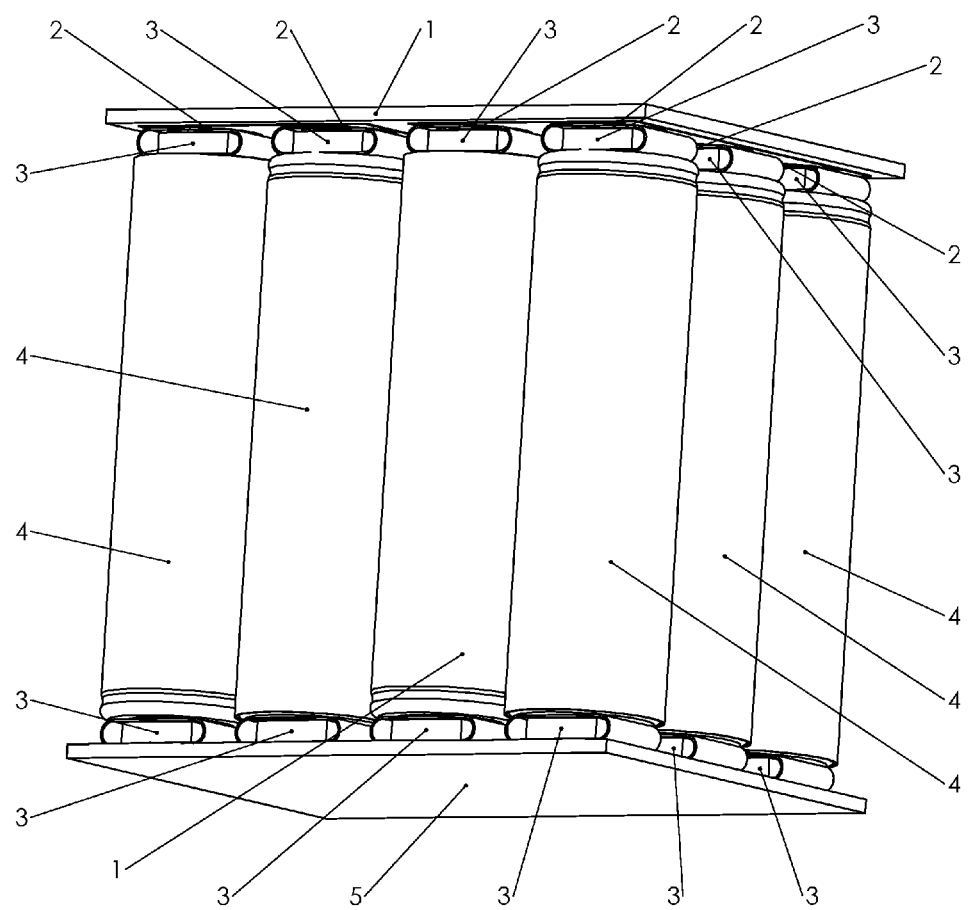
FIG. 2 illustrates multiple high conductivity battery contacts in a battery module.

FIG. 2 shows one possible way to use the invention in a larger assembly. High conductivity battery contacts can be used repeatedly on both ends to form a larger battery module. In this embodiment, the battery contact assemblies are used on both charged ends of each cylindrical battery cell. There are PCB's on opposite ends capping the assemblies. These PCB's have current carrying pathways connecting adjacent cells in one of two patterns: series connection and parallel connection. Another variation of a battery module has one high conductivity contact on one end of each cell. The other end of the cell can be electrically contacted in numerous traditional ways. It's also very common to stack more than one cylindrical battery cell in line so another variation could have two layers of cells with high current battery contacts capping each end.

Figure 3:
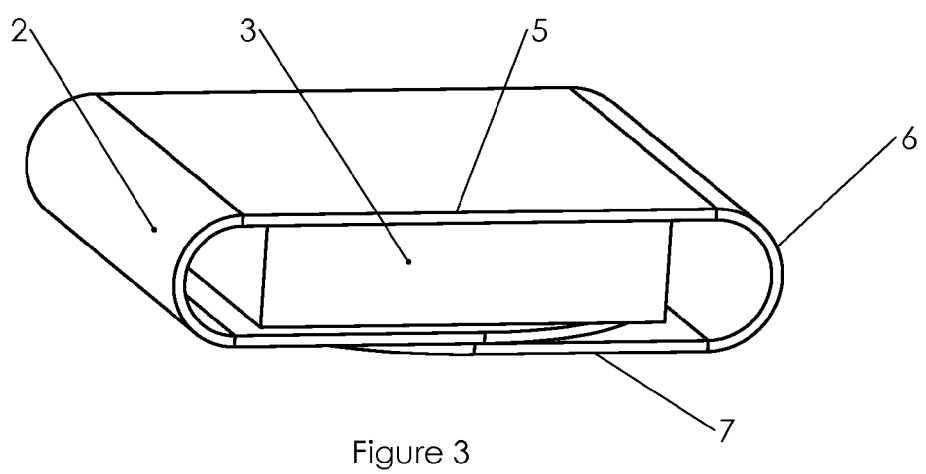
FIG. 3 illustrates a tab and elastomeric pad subassembly

FIG. 3 shows a close up of the tab and pad subassembly. The tab has three general sections: a tab mounting section 5 connected to the circuit board, a tab flexible intermediate section 6 that is flexible and a tab contact section 7 that is a contacting means for making electrical contact with a battery cell.

In this embodiment, the tab mounting section connected to the PCB is in the middle portion of the metal strip from which the tab is formed. It is mechanically connected to the circuit board and electrically connected to the current carrying pathways in or on the PCB. One way to accomplish both of these is to solder the tab to the current carrying pathway on the PCB. On a typical PCB the current carrying pathway or trace is bonded to the dielectric substrate and therefore the tab is indirectly mechanically held in position relative to the circuit board.

On the tab, the tab flexible intermediate section is a flexible section that allows small movement. It is located between the tab mounting section and the tab contact section. It is a curved section of sufficient radius to allow for the pad and to allow for flexing without binding. In order to have flexibility, the thickness of the metal in this section is on the order of 0.001 to 0.010 inches. To simplify construction, the entire tab could be made from thin metal with thickness on the order of 0.001 to 0.010 inches.

The tab contact section is a flat area so as to make substantial contact with the typically flat contact end of a cylindrical battery cell. The ends can be trimmed to present a rounded end shape to the battery contact since the typical battery contact is itself rounded and thus excess material is avoided. However, any number of unrounded, faceted or freeform shapes would also function.

Operation

The electrical current carrying capacity of the high conductivity battery contact is far higher than traditional battery contact assemblies. Traditional battery contact assemblies utilize steel coil springs or steel leaf spring contacts. Although electrically they are very different, the high conductivity battery contact operates mechanically in a similar manor to traditional battery contact assemblies.

The physical operation of the high conductivity battery contact is similar to traditional low conductivity battery contact assemblies. A cell is held in close proximity to the PCB so as to exert a contact pressure on the tab contact surface. This contact force in turn compresses the pad so as to consistently apply pressure contact between the battery cell and the tab contact. The pad pressure is created by being sandwiched on the other side by direct or indirect pressure from the circuit board. A tab made from thin soft metal does not have sufficient structural stiffness to provide reliable contact pressure on its own. Therefore the elastomeric pad is required to provide the necessary contact pressure.

If both ends of the battery cell utilize high conductivity battery contacts, then each of the battery cells are compressed between mirrored high conductivity battery contact assemblies. In this case the PCB's would need to be held in position by an external wall structure and possibly by spacers between PCB's. Such spacers could be slightly longer than the battery cells and just the right length to allow moderate compression of the elastomeric pads. They could be of small cross section in order to fit in between cells without taking up significant room. For larger battery assemblies, multiple spacers could be required to maintain the structural integrity of the PCB's. If the cells are not packed into close contact with one another, the spacers could also function to keep cells in position. On the outer perimeter of large battery assemblies, external wall structure or numerous spacers would be required so as to keep the perimeter cells from spilling out the sides.

The PCB provides structural support for the cylindrical battery cells to keep them parallel and all of their end surfaces in the same plane. Given the significant weight of a typical battery cell, the PCB requires great strength and rigidity. In addition, each elastomeric pad imparts a localized force on the PCB. A PCB provides both the required structural support and electrical pathways. PCB materials can have strength on the order of aluminum.

Servicing of a pack using high conductivity battery contacts is greatly simplified over traditional methods. When the PCB is lifted away from the cells, all of the contact assemblies are removed with it allowing for a neat modular assembly with no loose parts or wires.

A key attribute to the high conductivity battery contact is the ability of the tab to flex and accommodate slight variation in cell length. Also, during shock or vibration, the contact can maintain electrical contact because it is consistently pushed into contact by the elastomeric pad. Although this attribute is common among low conductivity battery contacts, it is a unique attribute for high conductivity battery contacts.

Second Embodiment

Figure 4:
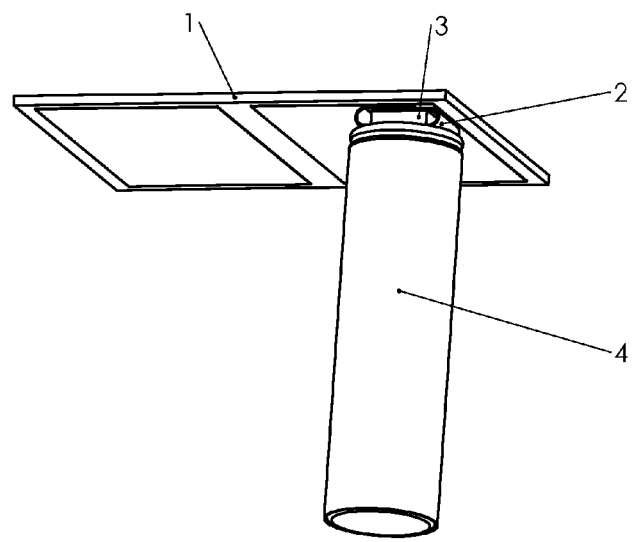
FIG. 4 illustrates another embodiment of the high conductivity battery contact with tab rotated.
Figure 4A:
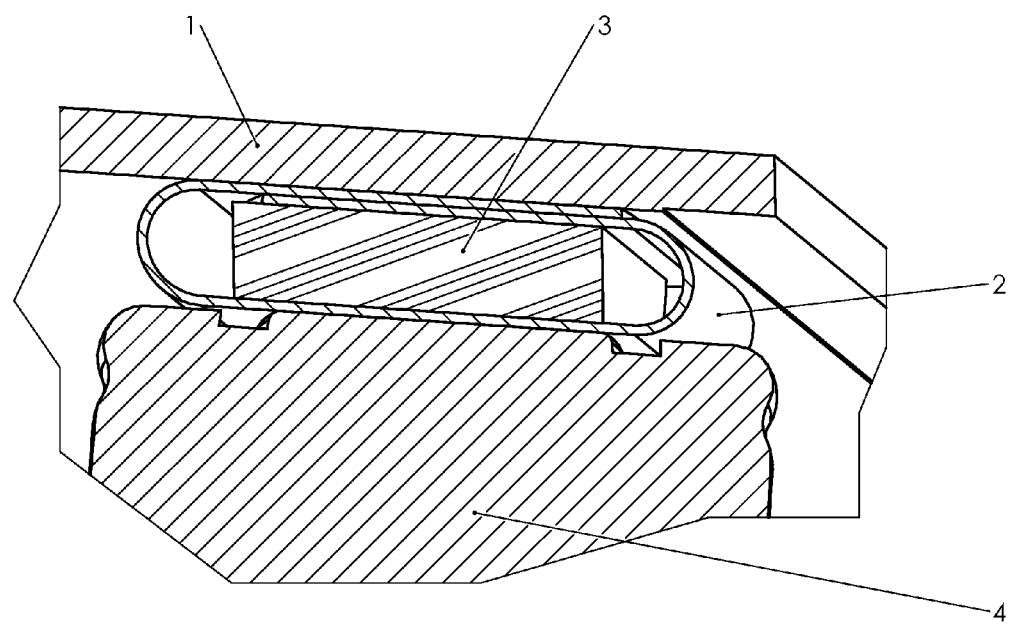
FIG. 4A illustrates a close-up view of another embodiment of the high conductivity battery contact with tab rotated.

Another embodiment of the current invention is illustrated in perspective in FIG. 4 and in sectioned close-up in FIG. 4A. These drawings are not to scale due to the thin nature of some of the parts.

This embodiment is similar to the previous embodiment except that the tab is turned over. The side that has overlapping ends is oriented to be on the side adjacent to the PCB. The middle flat portion of the tab is oriented adjacent to the battery cell.

In this, or other embodiments, the tab could be mechanically located by being soldered, welded or conductively adhered to either the battery cell or to the PCB. Other means of locating the tab are possible such as additional structure that registers on the battery cell or PCB. Electrical connection from the tab to both the PCB and battery cell are accomplished by the contact force generated by the compression of the elastomeric pad. Methods such as soldering, welding or adhesive add mechanical location of the tab and possible redundant electrical connection.

Additional Embodiments

Figure 5:
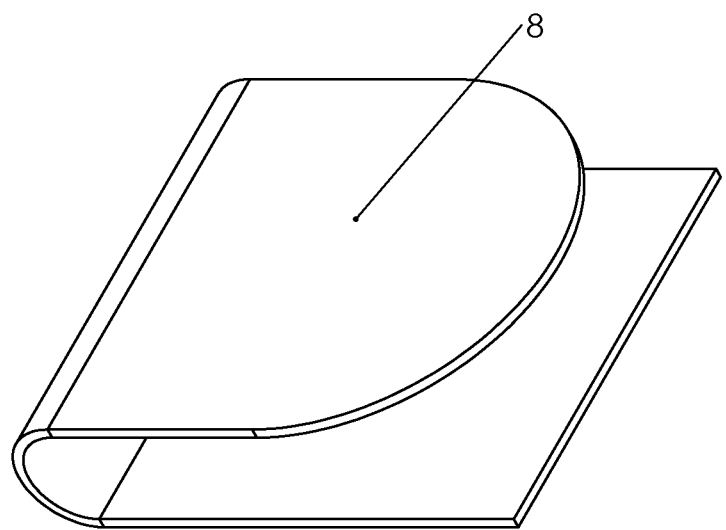
FIG. 5 illustrates another embodiment of a tab with single ear.

An additional embodiment of the tab 9 can be seen in FIG. 5. In this tab, the cross section is "c" shaped with flat upper and lower sections. It is the racetrack cross section previously described, but without the second semicircular end connecting the flat sections. There is no overlapping material in a third section that is a contacting means.

Additional tab embodiments could be made by having three, four or any number of tab contact sections that are contacting means. Each of these tab contact sections would be connected to the tab mounting section by a tab flexible intermediate section. The shape of the tab flexible intermediate section can also vary. A single bend is one possibility, but a sharp bend or a series of bends could also provide equivalent functionality.

Figure 6:
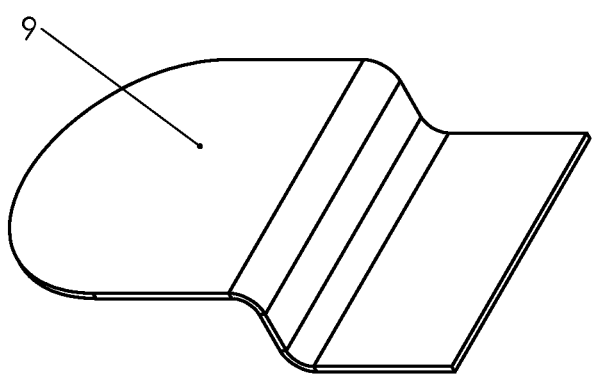
FIG. 6 illustrates another embodiment of a tab with a stepped shape.

Other tab profile shapes could be in the form of a stepped tab as shown in FIG. 6. In this embodiment, there would be a first straight section followed by a second section at an angle to the first section and followed by a third section being roughly parallel and offset to the first section.

Further tab embodiments could be made by utilizing different shapes. The ends could be round, square or any number of shapes. Likewise, the second section that is flexible could be many different shapes and long as the shape allowed flexibility. A variable thickness material could be used for the tab.

The tab is easily constructed from a strip of metal, but other construction and forms are possible. For instance, a tab could be in the form of a circular ring of metal. In this case it would make sense to cut the tab from a very thin metal tube.

The elastomeric pad can be made in numerous shapes and sizes. Examples include: a circular disc shape, a long strip that bridges multiple cells, a dome shape or a pyramid shape. A tapered or stepped shape that has variable planform area could provide non-linear force. This non-linear force could be useful to limit the maximum compression of the elastomeric pad during mechanical shock. Mechanical shock can occur from dropping the battery pack or from a vehicle collision. Also the pad could be made from multiple parts or multiple materials. Additional structure could be added to limit maximum compression of the elastomeric pad during mechanical shock.

The elastomeric pad could also be replaced with any number of compressive springs that would function equivalently. Some examples are: conventional wire coil springs, disc springs, wave disc springs, composite leaf springs or air springs. Since the tab provides the conductive pathway, the compressive spring does not need to be highly conductive. Such springs may be longer in length and therefore the tab contact section would need to be extended away from the surface of the PCB to compensate.

CONCLUSION, RAMIFICATIONS AND SCOPE

Thus the reader will see the high conductivity battery contact provides a unique solution to the problems of high current capacity, serviceability and ease of assembly while facilitating the addition of auxiliary electrical components on a PCB.

The use of a PCB provides solves numerous problems in traditional battery assemblies. It is cost effective and easy to manufacture. It provides strong structural support to maintain battery cells in position. It allows for complex multiple high current paths on one or more layers. It also facilitates the inclusion of low current auxiliary circuitry such as thermal, current and voltage sensors. It further allows the inclusion of almost any other type of electrical circuitry. All of this circuitry can be added without the complexity of routing additional insulated wires.

While various embodiments in accordance with the present invention have been described, it is understood that the invention is not limited thereto, and is susceptible to numerous changes and modifications as known to those skilled in the art. For example, the PCB could be more than one piece or made from many materials. The tab could have numerous shapes, sizes and materials. The elastomeric pad could also have numerous shapes, sizes and materials. Therefore, this invention is not limited to the details shown and described herein, and includes all such changes and modifications as are encompassed by the scope of the appended claims.

I claim:

1. A high conductivity battery contact for a cylindrical battery cell that has a length that is greater than twice its diameter, comprising:
   a printed circuit board;
   a tab substantially comprised of copper, gold, silver, or aluminum, the tab comprising:
   a mounting section electrically and physically connected to the printed circuit board;
   a flexible intermediate section; and
   a contact section having an inward facing surface and an outward facing surface; and
   an elastomeric pad in contact with the inward facing surface of the contact section and disposed between the contact section and the printed circuit board, pushing the outward facing surface of the contact section against an end of the cylindrical battery cell.

2. The high conductivity battery contact of claim 1, wherein the printed circuit board provides structural support to one or more cylindrical battery cells in a battery module.

3. The high conductivity battery contact of claim 1, wherein the tab has a thickness of 0.001 inches to 0.010 inches.

4. The high conductivity battery contact of claim 1, wherein the elastomeric material comprises silicone.

5. The high conductivity battery contact of claim 1, wherein the elastomeric material comprises silicone foam.

6. The high conductivity battery contact of claim 1, wherein the tab is connected to the printed circuit board by soldering, welding, or an electrically conductive adhesive.

7. A high conductivity battery contact for a cylindrical battery cell that has a length that is greater than twice its diameter, comprising:
   a printed circuit board;
   a substantially "C" or substantially oval shaped tab substantially comprised of copper, gold, silver, or aluminum, the tab comprising:
   a mounting section electrically and physically connected to the circuit board;
   a flexible intermediate section; and
   a contact section having an outward facing surface; and
   an elastomeric pad disposed at least partially inside the substantially "C" or substantially oval shaped tab, the elastomeric pad configured to force the contact section into electrical communication with an end of a cylindrical battery cell.

8. The high conductivity battery contact of claim 7 wherein the printed circuit board provides structural support for one or more cylindrical battery cells in a battery module.

9. The high conductivity battery contact of claim 7, wherein the tab has a thickness of 0.001 inches to 0.010 inches.

10. The high conductivity battery contact of claim 7, wherein the elastomeric material comprises silicone.

11. The high conductivity battery contact of claim 7, wherein the elastomeric material comprises silicone foam.

12. The high conductivity battery contact of claim 7, wherein the tab is electrically and mechanically connected to the printed circuit board by soldering or an electrically conductive adhesive.

13. The high conductivity battery contact of claim 1, wherein the outward facing surface of the contact section is substantially parallel with the circuit board.

14. The high conductivity battery contact of claim 7, wherein the outward facing surface of the contact section is substantially parallel with the circuit board.

15. The high conductivity battery contact of claim 7, wherein the tab is plated with metal.

16. The high conductivity battery contact of claim 7, wherein the shape of the tab comprises one or more straight sections or a break.

17. The high conductivity battery contact of claim 1, wherein the tab is plated with metal.

18. The high conductivity battery contact of claim 1, wherein the tab is configured into a substantially "C" or substantially oval shape, and wherein the elastomeric pad is disposed at least partially inside the tab.

19. The high conductivity battery contact of claim 18, wherein the substantially "C" or substantially oval shaped tab is configured where the tab overlaps itself.

20. The high conductivity battery contact of claim 18, wherein the substantially "C" or substantially oval shaped tab is configured with a gap between tab ends.

\* \* \* \* \*